United States Patent [19]

Ping et al.

[11] Patent Number: 5,541,797
[45] Date of Patent: Jul. 30, 1996

[54] TAPE CARTRIDGE BASE PLATE COMPRISING A NOVEL ALUMINUM ALLOY

[75] Inventors: Steven W. Ping, Pleasanton, Calif.; Christopher J. Zwettler, Maplewood, Minn.

[73] Assignee: Minnesota Mining and Manufacturing Company, St. Paul, Minn.

[21] Appl. No.: 550,182

[22] Filed: Oct. 30, 1995

Related U.S. Application Data

[63] Continuation of Ser. No. 281,070, Jul. 27, 1994, abandoned.

[51] Int. Cl.⁶ .................................................. G11B 23/02
[52] U.S. Cl. .................................................. 360/132
[58] Field of Search .................................................. 360/132

[56] References Cited

U.S. PATENT DOCUMENTS

| | | | |
|---|---|---|---|
| 4,669,019 | 5/1987 | Kuroda | 360/130.24 |
| 4,989,806 | 2/1991 | Eggebeen | 360/132 X |
| 5,080,252 | 1/1992 | Haga | 360/132 X |
| 5,204,796 | 4/1993 | Koizumi et al. | 360/132 |
| 5,287,240 | 2/1994 | Koizumi et al. | 360/132 |
| 5,294,072 | 3/1994 | East et al. | 360/132 X |

OTHER PUBLICATIONS

*The Aluminum Association (Publication Revised: Feb. 1991)*, "Registration Record of Aluminum Association Designations and Chemical Composition Limits for Wrought Aluminum and Wrought Aluminum Alloys", pp. 1–11.

*Primary Examiner*—John H. Wolff
*Attorney, Agent, or Firm*—Gary L. Griswold; Walter N. Kirn

[57] ABSTRACT

A tape cartridge comprising a flat base plate and component parts mounted on the plate, including pins that are nominally perpendicular to the base plate and which support and facilitate tape transfer within the cartridge; the plate comprising an aluminum alloy having a yield stress in the range from about 25,000 to 30,000 psi. The base plate preferably comprises from about 0.5 to 3 parts by weight Si and from about 0.1 to 0.7 parts by weight Fe, based on 100 parts of the aluminum alloy. The base plate of the present invention may optionally comprise one or more of the following: up to about 1 part by weight Mn; up to about 2 parts by weight Mg; and mixtures thereof; based on 100 parts of the aluminum alloy.

7 Claims, 2 Drawing Sheets

TAPE CARTRIDGE BASE PLATE COMPRISING A NOVEL ALUMINUM ALLOY

This is a continuation of application Ser. No. 08/281,070 filed Jul. 27, 1994, now abandoned.

FIELD OF THE INVENTION

This invention relates to belt-driven tape cartridges, and in particular, base plates used therein.

BACKGROUND OF THE INVENTION

The manufacture of tape cartridges involves the assembly of precision components which enable magnetic recording tape to be operated in the tape cartridge in a manner achieving very high areal recording densities. Such product performance requirements are increasingly rigorous in the areas of speed and capacity. These performance characteristics are determined by various component related features. A particularly important component is the tape cartridge base plate. The base plate topography affects the perpendicularity of pins mounted in the base plate. These pins support other components of the tape cartridge, which in turn affect the performance obtained from a tape moving in the tape cartridge.

The designers and manufacturers of tape cartridge base plates have focused on improved flatness and rigidity as primary features in controlling the quality of base plates. Other focus areas involve the methods of forming and blanking the metal used in the manufacture of the base plates.

This invention provides a new and different approach to controlling base plate quality, particularly to the flatness of the base plate. In brief summary, a tape cartridge of the present invention comprises a flat metallic base plate comprising an aluminum alloy, and component parts mounted on the plate, including pins that are nominally perpendicular to the plate and which support and facilitate tape transfer within the cartridge. The base plate comprises an aluminum alloy having a yield stress in the range from 25,000 to 30,000 psi.

Within the present invention, the shear properties of an aluminum alloy base plate can be improved by adjusting the composition of the aluminum alloy. A composition shown to produce base plates with desired shear properties comprises from about 0.5 to 3 parts by weight silicon and from about 0.1 to 0.7 parts by weight iron, based on 100 parts of aluminum alloy. The aluminum alloy of the present invention may optionally comprise one or more of the following: up to about 1 part by weight Mn; up to about 2 parts by weight Mg; and mixtures thereof; based on 100 parts of aluminum alloy.

The present invention further provides a tape cartridge base plate comprising the above-described aluminum alloy.

DETAILED DESCRIPTION OF THE INVENTION

Figure 1:
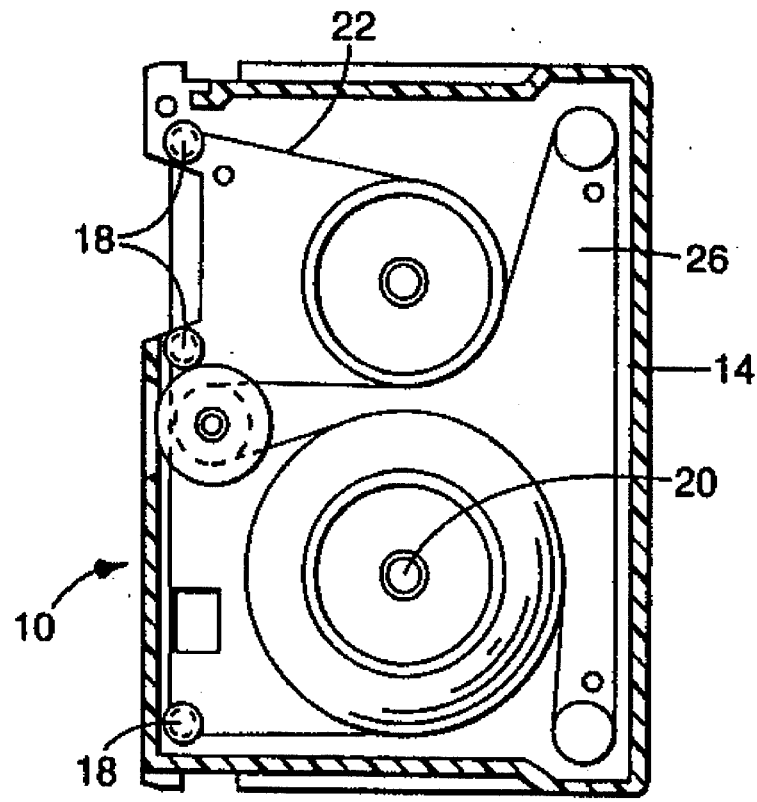
FIG. 1 is a schematic illustration of a belt driven tape cartridge with the cover removed.

A tape cartridge, such as the 5¼" data storage tape cartridge 10 shown in FIG. 1, comprises a base plate 14 that is useful for providing support and mounting for various components, including pins 18 or rollers 20 which facilitate the transport of the tape 22. It is important that the base plate 14 be precisely flat, and that the pins 18 and rollers 20 be precisely perpendicular to the base plate 14. Ensuring the flatness of the base plate and the perpendicularity of the pins and rollers to the base plate will ensure that the tape transport path is parallel with the plane of the base plate at the point of tape presentation at a tape head.

Figure 2:
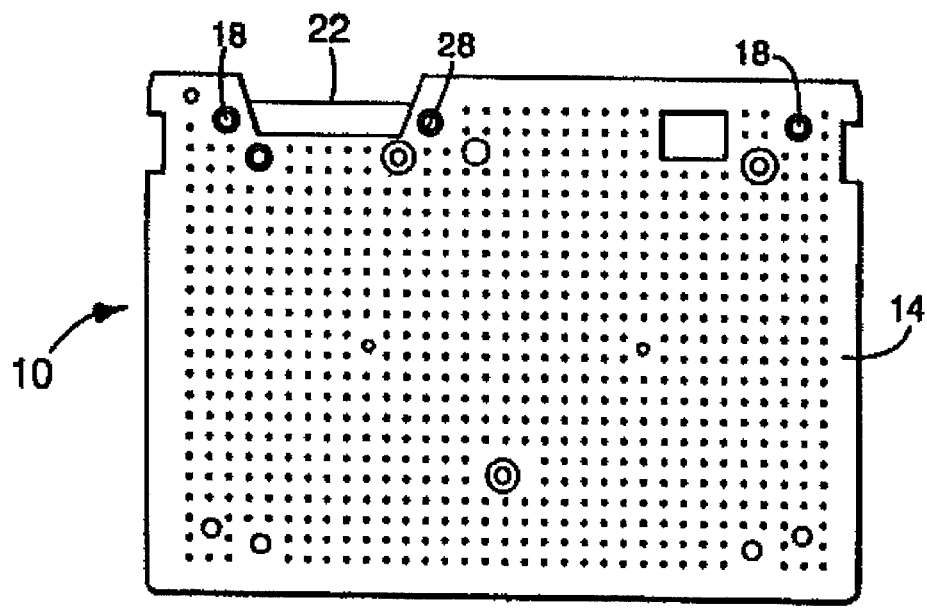
FIG. 2 is a bottom plan view of a base plate for a tape cartridge.

FIG. 2 is a bottom plan schematic illustration of a base plate 14 for a so called mini-data cartridge such as a DC-2000 mini-cartridge made and sold by Minnesota Mining and Manufacturing Company (3M). The base plate 14 comprises a rigid, flat, aluminum alloy plate manufactured to impart overall strength to tape cartridge 10, as well as to provide a rigid support platform for tape 22 and the pins and rollers which guide the tape during use.

Figure 3:
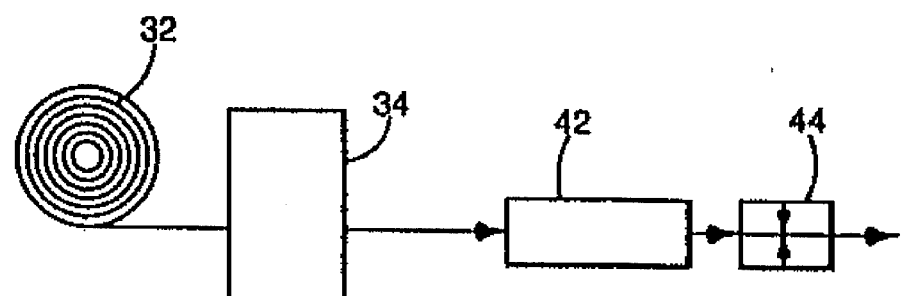
FIG. 3 is a schematic illustration of a process for manufacturing a tape cartridge base plate.

FIG. 3 illustrates, in part, a process of manufacturing base plates similar to base plate 14. In that process, a supply of aluminum alloy 32 is provided in roll form to a leveler device 34. Leveler device 34 levels and flattens the aluminum alloy 32 prior to feeding the aluminum alloy to die means 42. Die means 42 is used to create a base plate-shaped article and to form and further refine the shape of apertures and boundaries of the base plate. The base plate may then be anodized at anodization means 44. Alternatively, anodizing means 44 may be eliminated by providing a pre-coated (anodized, epoxy coated, or the like) aluminum alloy supply 32 for subsequent forming into a base plate, as is described in European patent application No. PCT/US93/04054.

After the aluminum alloy is flattened and the base plate 14 is formed by die means 42, the pins 18 and rollers 20 can be installed into the base plate 14. A useful procedure for such installation is to install the pins and rollers in apertures preformed by the die means 42. FIG. 2 shows cylindrical surfaces 28, each of which defines an aperture extending through base plate 14, in precisely perpendicular relation to a reference surface 26. The aperture or hole created by surface 28 has a suitable diameter for insertion of a matched-diameter pin or roller. Reference surface 26 is a precisely flat plane defined by three points on the surface of base plate 14. In the ideal situation the surface of base plate 14 is perfectly flat, and is identical to the plane of reference surface 26.

Figure 4:
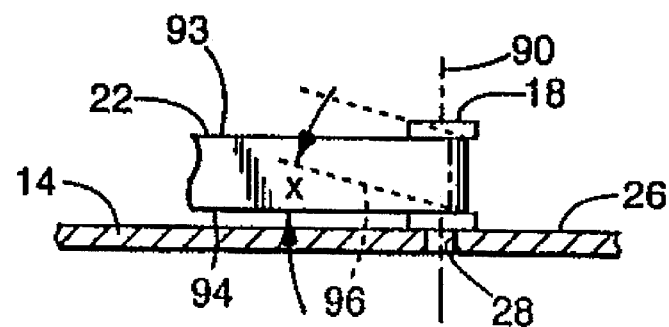
FIG. 4 is an enlarged view of a tape transfer pin mounted on a tape cartridge base plate.

FIG. 4 illustrates the effect of providing perpendicular orientation for a pin 18 mounted in an aperture created by surface 28 within base plate 14. When pin 18 is perpendicular to reference surface 26, tape 22 experiences the ideal condition of symmetric tape tension. Tape side edges 93 and 94 will be perfectly parallel to reference surface 26. However, when surface 28 is not perpendicular to reference surface 26, the vertical axis 90 of pin 18 will be configured in a non-perpendicular relation to reference surface 26. Similarly, when surface 28 is not uniform throughout its depth, the vertical axis 90 of pin 18 will be configured in a non-perpendicular relation to reference surface 26. Under these conditions, tape 22 will not experience symmetric tape tension, and is likely to be oriented so that tape side edges 93 and 94 are not parallel to reference surface 26, as illustrated by dashed lines 96. Angle x represents either a positive or negative angle between tape side edge 96 and reference surface 26 whenever tape 22 is not positioned parallel to reference surface 26. When the tape is not parallel to the reference surface 26, the quality of tape presentation at a tape head is sub-optimum. Accordingly, the degree of perpendicularity of pin 18, or lack thereof, affects the angle of tape 22 relative to a base plate reference surface 26, and affects the ability of a recording/playback head to read or record tape 22.

Figure 5:
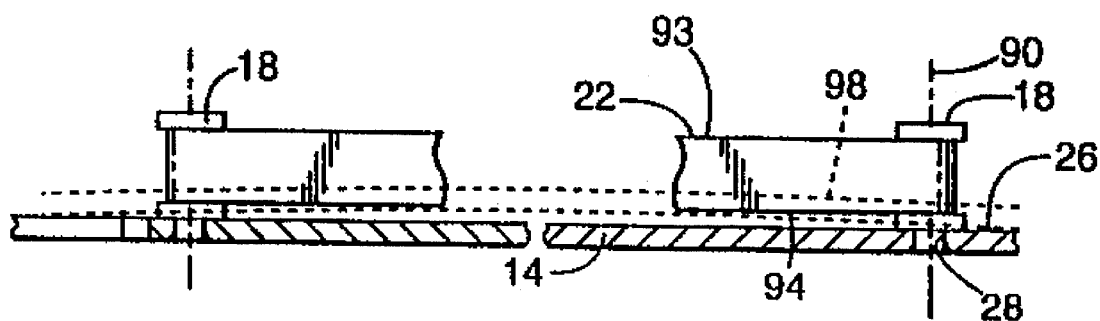
FIG. 5 is an enlarged view of a magnetic recording tape being transferred around two pins mounted on a tape cartridge base plate.

Even if each pin 18 is positioned to be perfectly perpendicular to base plate 14 at the point where the pin enters the plate, tape 22 could still experience non-symmetric tape tension if the plate is not flat over its whole area. FIG. 5 illustrates this effect. When base plate 14 is perfectly flat, each pin 18, mounted on plate 14, will be perpendicular to reference surface 26 and parallel to the other pins. When each pin 18 is perpendicular to reference surface 26 and parallel to the other pins, tape 22, traveling between pins 18, experiences the ideal condition of symmetric tape tension. In such a condition, tape side edges 93 and 94 are perfectly parallel to reference surface 26. However, when base plate 14 is not perfectly flat, as indicated by dashed line 98, base plate 14 is not completely contained within the plane of reference surface 26, and each pin 18, mounted to plate 14, may not be perpendicular to reference plane 26 and parallel with the other pins. In this situation, tape 22, traveling between pins 18, will not experience symmetric tape tension, and is likely to be oriented so that tape side edges 93 and 94 are not parallel to reference surface 26. The effect is similar to that illustrated by dashed lines 96 in FIG. 4, wherein angle x represents a positive or negative angle between tape side edge 96 and reference surface 26 whenever tape 22 is not positioned parallel to reference surface 26. When the tape is not parallel to the reference surface 26, the quality of tape presentation at a tape recording/playback head is sub-optimum. Accordingly, the flatness of the base plate 14, or lack thereof, affects the orientation of tape 22 relative to base plate reference surface 26, which in turn affects the ability of a recording/playback head to read or record tape 22.

The present invention overcomes various problems associated with prior materials used in the manufacture of base plates which limit the performance of tape cartridges comprising those base plates. The two above-stated factors, degree of flatness of the aluminum alloy base plate after it has been flattened and stamped, and the perpendicularity of the pins 18 after they are installed, significantly affect the performance of tape cartridges by affecting the orientation of tape 22 relative to the base plate reference surface 26. Each of these factors is related to the choice of material provided as the supply of aluminum alloy 32 used to produce the base plate 14.

A desirable property of an aluminum alloy to be used in the production of a base plate is that it be easy to flatten to a precise degree of flatness. Base plate flatness is directly influenced by the mechanical strength of the aluminum alloy; i.e. flattening is easier when the aluminum alloy has low strength. The conventional material used to produce base plates is an aluminum alloy known as Aluminum Association Alloy 5052. However, this aluminum alloy has proven to be difficult to flatten at times and its typical degree of flatness has been subject to improvement. The problem becomes more apparent with the development of new high capacity applications utilizing increased tracks and data density.

A further desirable property of an aluminum alloy used in the production of base plates is that it be shearable without burring. The shearability of a base plate is affected by the hardness of the aluminum alloy with which it is produced, as well as the particular composition of the aluminum alloy. Aluminum alloys of different hardness and composition can shear differently, causing a punched hole either to burr, or to break in a nonuniform manner. Generally, as a particular aluminum alloy is hardened, the punched hole or sheared edge has less burr. Also, if an aluminum alloy composition has poor shear properties, standard punch and die stamping methods can produce a surface 28 which is not uniform throughout its depth, and which is not a uniform diameter from base plate to base plate. These non-uniformities result in the pins being variably secured in the apertures, with an attendant variation in perpendicularity.

The present inventors have found that a base plate of the present invention can be chosen to exhibit one or more desired properties. These properties include desired yield stress and preferred shear properties. In the practice of the present invention, a useful base plate is one which exhibits a yield stress low enough to allow the material to be easily flattened to an optimal flatness level, i.e. as close to a perfectly flat plane as possible, but not so soft that the base plate suffers adverse consequences during handling. An example of an adverse consequence is "mushrooming" of the base plate material upon being dropped on a corner. Evaluations have shown that adverse consequences such as mushrooming can best be prevented by using base plate materials having a yield stress of about 20,000 pounds per square inch (psi) or more, preferably about 25,000 psi or more. On the other hand, best flatness is obtained when the yield stress of the base plate is about 30,000 psi or less. Thus, preferred aluminum alloys of the present invention have a yield stress in the range from about 25,000 to 30,000 psi.

Base plate materials of the present invention can also be chosen to give base plates which exhibit desirable shear properties. Evaluations have shown that the base plate materials of the present invention may be subjected to shearing and punching processes to produce nearly burr-free edges and holes. The base plate material of the present invention shears and breaks more in line with punch and stamping dies, producing less angled "break-out." These burr-free holes, which are less prone to "break-out," allow more intimate contact of the base plate with the pins and rollers, and consequently more bearing area on the pins and rollers. This increased pin bearing area produces a significant improvement in the degree of perpendicularity of the pin in relation to the baseplate, which in turn improves the angle of the tape 22 to the base plate reference surface 26.

In the practice of the present invention, shear properties of an aluminum alloy can be improved by adjusting the composition of the aluminum alloy. Silicon is relatively brittle, and when absorbed within an aluminum alloy, is believed to facilitate cracking of the aluminum alloy during shear. Additionally, silicon is believed to form inter-metallic compounds within the aluminum alloy, with aluminum and with other elements (e.g. Mn, Fe, and Mg). These inter-metallic compounds, like silicon, are relatively brittle. Both the silicon and the inter-metallic silicon compounds are believed to facilitate cracking of the aluminum alloy during shear, thereby preventing the possible angled break out, "smearing," and/or "burring" of the aluminum alloy upon exposure to shear. Evaluations have shown that base plate materials which comprise from about 0.5 to 3 parts by weight silicon and from about 0.1 to 0.7 parts by weight iron, based on 100 parts aluminum alloy, will exhibit desired shear and yield stress properties. Preferably the base plate material will comprise from about 1 to 3 parts by weight silicon and from about 0.2 to 0.7 parts by weight iron, based on 100 parts aluminum alloy.

The aluminum alloy of the present invention may optionally comprise one or more of: up to about 1 part by weight Mn, preferably from about 0.2 to 1 parts by weight Mn; up to about 2 parts by weight Mg, preferably from about 0.1 to 1 parts by weight Mg; and mixtures thereof; based on 100 parts by weight of the aluminum alloy. An aluminum alloy of the present invention may further comprise other elements such as, for example, up to about 1 part by weight Cu; up to about 0.5 parts by weight Zn; and up to about 0.15 parts by weight Ti, based on 100 parts of the aluminum alloy.

A preferred embodiment of an aluminum alloy of the present invention comprises from about 1 to 3 parts by weight Si; from about 0.2 to 0.7 parts by weight Fe; from about 0.2 to 1 parts by weight Mn; from about 0.1 to 1 parts by weight Mg, up to about 0.7 parts by weight Cu; up to about 0.2 parts by weight Zn; and up to about 0.05 parts by weight Ti, based on 100 parts of the aluminum alloy, with the balance being aluminum.

The present invention considerably lowers the reject rate of base plates over the reject rates of base plates produced from conventional materials. This reject rate reduction is due partly to the improved flatness of the base plates produced with the new aluminum alloy. Also, the reduction is due to the fact that in addition to the improved flatness, base plates made with the novel aluminum alloy show considerably less thickness variation than base plates made with the conventional 5052 aluminum alloy. Finally, this reduction in rejects is also due, in part, to the appearance of the base plates produced from the new aluminum alloy.

A further desirable property of an aluminum alloy used in the production of base plates is that its surface appearance be free from imperfections and blemishes. Base plate appearance is important to customers, and surface blemishes, e.g. scratches, stains, and microstructural features, are often highlighted when the baseplate is anodized to the bright "chrome-like" finish which is typical for conventional base plate materials such as anodized 5052 aluminum alloy. As opposed to a bright, chrome-like finish, the novel aluminum alloy naturally anodizes to a matted grey color and sheen which effectively masks minor surface imperfections. The grey color allows for fewer rejected base plates due to aesthetic reasons, compared to bright anodized 5052 aluminum alloy base plates.

The present invention will now be more fully described by the following illustrative example.

EXAMPLE 1

One thousand 5¼" form factor tape cartridge base plates were produced from an aluminum alloy commercially available from Kaiser Aluminum & Chemical Corp., designated as K423 aluminum alloy, having the following composition: about 1.7 parts by weight Si; about 0.4 parts by weight Fe; about 0.9 parts by weight Mn; about 0.5 parts by weight Mg; about 0.05 parts by weight Ti, and less than about 0.15 parts by weight of various other elements including copper and zinc, based on 100 parts of the aluminum alloy with the balance being aluminum. One thousand of the same size base plates were produced from the conventional 5052 aluminum alloy. Three base plates were taken after every 100 base plates produced in sequence. From these samples, flatness measurements were taken at two different locations, and also for overall flatness. Flatness was measured by mounting the base plate in a fixture having 3 locating points which contact the top of the base plate. This fixture was then mounted on a surface plate and the relative heights of positions on the base plate were measured with a height gauge.

Location 1 was chosen near the center and toward the front of the plate, to measure the flatness across the front of the cartridge. Location 2 was chosen near the tape guide on the door side of the cartridge, to measure flatness in the area where the tape guide is pressed. The overall flatness of the base plate was measured as the difference between the highest peak and the lowest valley on the base plate, wherever the highest peak and lowest valley would occur.

The flatness measurements were then tabulated, and the overall mean and standard deviations of the measurements are given in table 1. The overall mean can be easily controlled to any desired value (e.g. zero), by adjusting the set point of the leveler, and therefore is not significant in showing improved flatness. The standard deviation value of the measurements is more significant in showing the improvement between the two aluminum alloys because the standard deviation shows the amount of variance in flatness of the samples about the chosen mean.

TABLE 1

|  | 5052 aluminum alloy | | | K423 aluminum alloy | | |
| --- | --- | --- | --- | --- | --- | --- |
|  | flatness location 1 | flatness location 2 | overall flatness | flatness location 1 | flatness location 2 | overall flatness |
| overall mean | 0.36 | −0.19 | 3.97 | 1.02 | 0.29 | 2.75 |
| est. std. dev. | 1.13 | 0.41 | 0.66 | 0.46 | 0.19 | 0.38 |

Table 1 shows that the base plates produced from the K423 aluminum alloy were flatter than the base plates produced from the 5052 aluminum alloy because there was less variance about the mean value.

Of the same samples, the plate thickness was measured near the front of the plate and near the back of the plate.

TABLE 2

|  | 5052 aluminum alloy | | K423 aluminum alloy | |
| --- | --- | --- | --- | --- |
|  | plate thickness (front) | plate thickness (back) | plate thickness (front) | plate thickness (back) |
| est. std. dev. | 0.00021 | 0.00027 | 0.00014 | 0.00019 |

Table 2 shows that there was considerably less thickness variation in the base plates produced from the K423 aluminum alloy than in the base plates produced from the 5052 aluminum alloy.

What is claimed is:

1. A tape cartridge comprising a flat base plate and component parts mounted on the base plate, including pins that are substantially perpendicular to the base plate and which support and facilitate tape transfer within the cartridge; the base plate comprising an aluminum alloy comprising 0.5 to 3 parts by weight Si, and having an average yield stress in the range from 20,000 to 30,000 psi, said base plate having a softness that allows precise flattening, and said base plate being shearable to produce substantially burr-free edges and holes, whereby an improved tape cartridge base plate is obtained.

2. The tape cartridge of claim 1, wherein the base plate comprises an aluminum alloy having from about 0.5 to 3 parts by weight Si and from about 0.1 to 0.7 parts by weight Fe based on 100 parts of the aluminum alloy.

3. The tape cartridge of claim 2, wherein the aluminum alloy further comprises up to about 1 part by weight Mn based on 100 parts of the aluminum alloy.

4. The tape cartridge of claim 2, wherein the aluminum alloy further comprises up to about 2 parts by weight Mg based on 100 parts of the aluminum alloy.

5. The tape cartridge of claim 1, wherein the base plate comprises an aluminum alloy having:

from about 1 to 3 parts by weight Si;

from about 0.2 to 0.7 parts by weight Fe;

from about 0.2 to 1 parts by weight Mn;

from about 0.1 to 1 parts by weight Mg;

up to about 0.7 parts by weight Cu;

up to about 0.2 parts by weight Zn; and up to about 0.05 parts by weight Ti, based on 100 parts of the aluminum alloy.

6. The tape cartridge of claim 5, wherein the base plate is anodized to a matte grey color.

7. The tape cartridge of claim 1, wherein the aluminum alloy has a yield stress of at least about 25,000 psi.

* * * * *